Patented July 5, 1938

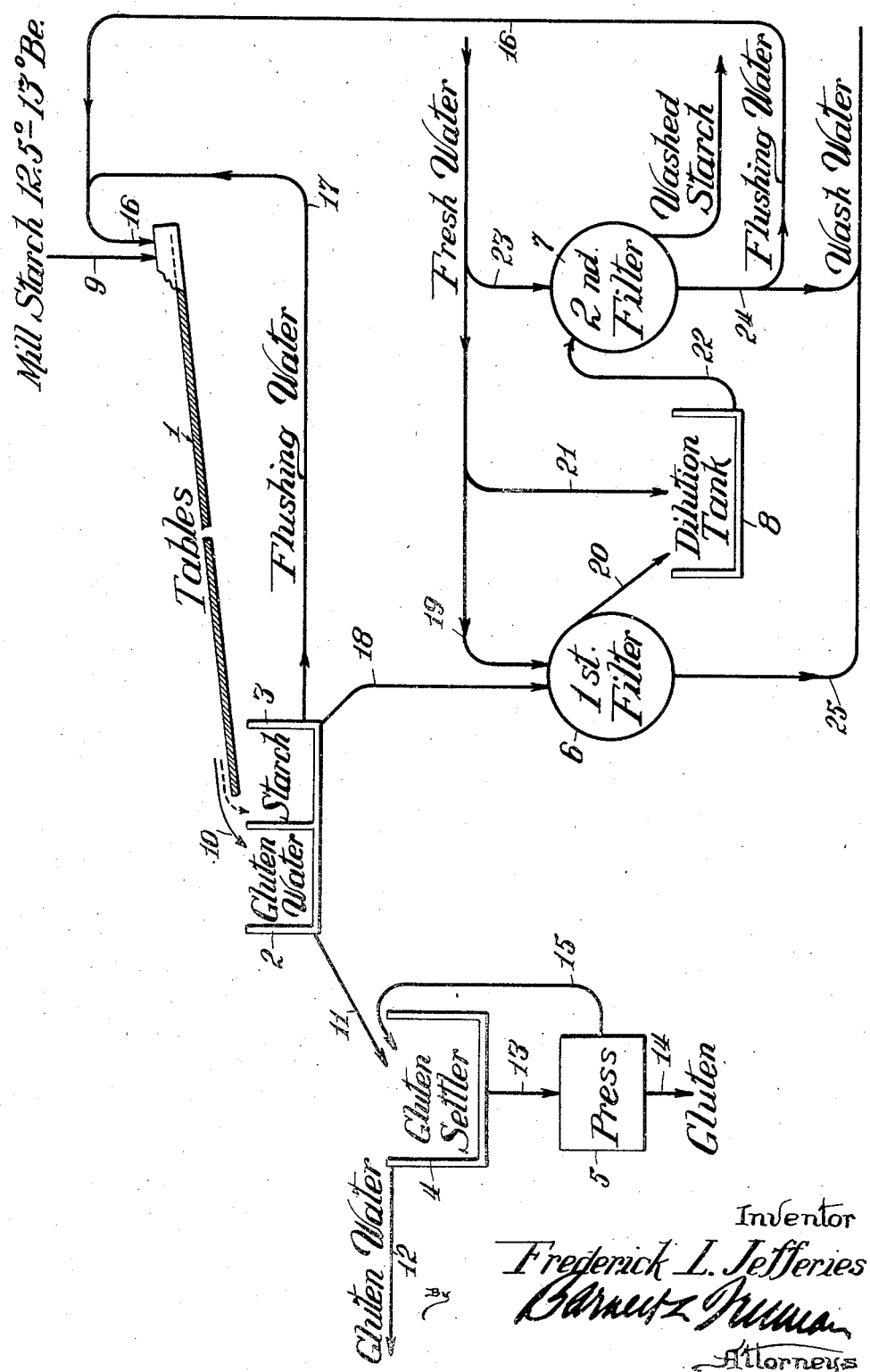

2,122,647

UNITED STATES PATENT OFFICE 2,122,647

STARCH TABLING PROCESS

Frederick L. Jefferies, La Grange, Ill., assignor to International Patents Development Company, Wilmington, Del., a corporation of Delaware Original application April 26, 1933, Serial No. 668,095. Divided and this application December 12, 1934, Serial No. 757,179. Renewed May 23, 1938. In Canada April 5, 1933

7 Claims. (Cl. 127—69)

This invention relates to the manufacture of starch from corn and more particularly to the separation of the starch from the gluten by an operation known as "tabling" in which the mixture of starch, gluten and water, referred to as mill starch or starch milk (derived from the operations in which the germs, hulls and fibre are separated from the comminuted corn) is caused to flow through long narrow and shallow inclined troughs, called tables, upon which the starch is deposited and from the lower ends of which the gluten and bulk of the water in the mill starch overflows into tanks or "gluten settlers" in which the gluten is separated by subsidence from the water and from which the water, known as "gluten water", is siphoned off, and, according to modern practice, is returned to the starch making process for re-use and the ultimate saving of the solid substances, mostly corn solubles, contained therein.

The present invention provides an improvement upon the heretofore customary method of tabling the mill starch, which improvement involves delivering the mill starch to the table heads at a much higher density, i. e. lower water content than has heretofore been the practice or has been considered possible, together with certain changes in operating conditions, which have been found necessary, or at least desirable, when the table head densities are increased to the extent contemplated by the invention. The purposes of this change in tabling practice are first to make possible a substantial reduction in the volume of gluten water issuing from the gluten settlers, which because of its high content of solubles and micro-organisms should be discharged to rivers and streams as sparingly as possible, if at all, and if returned to the process, for the prevention of stream pollution, economy of water, and recovery of solubles, should be distributed to certain places in the system where the micro-organic activity which the gluten water return promotes will be as little detrimental as possible—an object facilitated by the reduction in volume of the gluten water; second, to improve the separation between the starch and gluten, so that there will be less gluten in the starch and less starch in the gluten; and third, to reduce the amount of tabling and settling equipment and the time required for these operations. This application is a division of my co-pending application, Serial No. 668,095, filed April 26, 1933, for Manufacture of starch (issued August 3, 1937 as U. S. Patent 2,088,706); and the invention was described in substance, if not in all details, in application filed by the inventor, April 22, 1932, Serial No. 606,897, for Manufacture of starch from corn (issued December 22, 1936 as U. S. Patent 2,065,313).

I do not claim the herein described improved method of tabling when combined with the other process steps described and claimed in the aforesaid earlier applications; the present application seeking to claim the novel and improved tabling process by itself for application to any starch making system in which it can be used advantageously.

The invention is illustrated in the accompanying drawing which is a diagram showing the operations of tabling the starch, settling the gluten and washing the starch.

Referring to the drawing, 1 designates one of the starch tables; 2 the common trough for receiving the gluten and water from a number of adjacently arranged tables; 3 the trough for receiving the starch when flushed from the tables, the more common method used at the present time for removing starch from starch tables; 4 one of the gluten settlers; 5 the press for removing the water remaining in the gluten after the bulk of the gluten water has been siphoned off; 6 and 7 the starch washing filters; and 8 the dilution tank in which the starch is diluted between filtering operations.

The mill starch is discharged to the upper or head end of the tables through pipe 9. The starch is deposited on the tables in the form of long, thin wedges which are thickest at the table heads. The gluten and water are discharged from the ends of the tables into the troughs 2, as indicated by the arrow 10. From the trough 2, the gluten and water are discharged through conduit 11 into the gluten settlers. Here the gluten subsides. The gluten water is drawn off through conduit 12, and the gluten passed through conduit 13 to the press 5 from which the relatively dry gluten is discharged, as indicated at 14, the water being returned to the gluten settlers through conduit 15.

The starch deposited on the tables is removed by flushing water discharged to the table heads from pipe 16. The flushing water may be fresh water or a light process water such as the wash water derived from the washing of the starch on filters to be described. The flushing water is circulated repeatedly over the tables, the water returning from the trough 3 to the table heads through pipe 17, until a starch suspension of proper density has been reached, whereupon this relatively heavy liquor is discharged through pipe 18 to the first filter 6, where the starch is de-watered and then washed with fresh water entering the system through pipe 19. The washed starch stripped from filter 6 is discharged through conduit 20 to the dilution tank where it is mixed with water discharged into the tank through branch pipe 21 of the fresh water line. The diluted starch passes through conduit 22 to the second filter 7 where the starch is again de-watered, and then washed with fresh water introduced through branch pipe 23. The pipe 16, which brings the flushing water to the table heads, is shown as a branch from the wash water discharge pipe 24 of filter 7. The discharge pipe 24 connects with the wash water discharge pipe 25 from the first filter 6. Ordinarily the wash water in pipe 25 is returned to the starch making process for re-use. The solids which tail off with the major portion of the water in the mill starch may consist of somewhat more than one-half gluten, that is protein, the rest being mostly starch. The starch from the tables, when washed, should contain but a fraction of one per cent of protein; and by the statement in the claims that substantially all of the gluten is separated from the starch, it is not intended to imply that the starch may not contain such minute quantities of residual gluten.

The process—so far as described—has been in use for some time. In fact the tabling of mill starch to remove the gluten therefrom is an expedient which has been used for a great many years and for a long period of time has been the accepted method of separating gluten from starch in corn starch factories. For many years it has been the practice to table the mill starch at densities between 5° and 7° Baumé. It has been the general belief or assumption throughout the industry and for many years prior to the present invention that to bring about a proper separation of the gluten from the starch on the starch tables, the densities of the mill starch should not be in excess of about 7° Baumé or at the most 8° Baumé. In some factories tabling densities have been as low as 5° or 5½° Baumé. The applicant, however, has discovered that it is possible to table mill starch at very much increased table head densities and to get as good a separation between the starch and gluten, in fact even a better separation, than with the lighter liquors. For example, by passing smaller volumes of the mill starch over the tables per unit of time and increasing the pitch of the tables, it is possible to satisfactorily table a mill starch liquor of 13° Baumé or even of 15° Baumé, and to get a better separation, that is, less starch in gluten and less gluten in starch, than has heretofore been obtained by tabling at densities of 5° to 7° Baumé. Starch tables in different factories may differ somewhat in length, width and pitch. Ordinarily the tables are about 110 feet long, 2 feet wide, and have a pitch of about 5 inches from end to end. Under these conditions the mill starch (5° to 7° Baumé) is ordinarily delivered to the tables at approximately three gallons per minute per table. In accordance with the present invention with tables as described (but having a pitch of 10 inches instead of 5 inches for reasons to be stated) mill starch of a density, for example, of 13° Baumé is supplied to the table heads at the rate of about 1.8 gallons per minute, per table. If the tabling density be in the neighborhood of 11° Baumé, the rate of delivery to the tables may be somewhat more rapid, say 2.0 gallons per minute. For a 15° Baumé liquor the rate may be 1.2 gallons. For a density of 8° Baumé the supply should be about 2.5 gallons per minute. It will be obvious that these figures are only approximate and are based upon table dimensions and table pitch as stated. Approximately the rate of delivery to the tables should be in inverse ratio to the density of the liquor, assuming that the tables are the same. In order to get the best results, however, the pitch of the tables should be increased over that which has been customary; that is, the pitch of the tables should vary directly as the density of the mill starch. In reference to pitch, in order to get the best results, the usual pitch of 5 inches—that is, the table heads 5 inches above the ends of the tables—should be increased to 12 inches for a liquor of 15° Baumé. That is the pitch ratio should be increased within the range 1–264 to 1–110 depending upon the density of the mill starch treated. For liquor of 13° Baumé the pitch should be about 10 inches.

If attempt be made to table mill starch at densities substantially greater than those of standard practice, delivering the mill starch to the table heads at the same rate and with the tables pitched to the same inclination as prescribed by standard practice, it will be found that the amount of starch tailing off with the gluten will be increased and also the amount of gluten deposited with the tabled starch. That is, the separation is less efficient both from the point of view of starch in gluten and from the point of view of gluten in starch. The increase in starch in gluten is apparently due to the fact that the starch particles, which constitute the major portion of the solids in the magma, being closer together in the higher density mill starch, subside to the table, or to the accumulated starch on the table, less readily than in the case of a more dilute magma. The increased deposit of gluten is apparently due largely to the shrinkage in volume of the mill starch, as it flows down the table, because with the higher density mill starch the proportion of water to solids is diminished.

By increasing the pitch of the tables a faster flow results which can be made to compensate for the shrinkage in volume so that all of the gluten, within working tolerances, will be carried over the ends of the tables, giving a tabled starch of the requisite high purity. However, under these conditions, i. e. increased density, increased pitch of the tables, but no change in the rate of delivery to the tables, the tendency of the starch, due to the increased density of the mill starch, to tail off with the gluten is enhanced as a result of the increased velocity of flow, less time being allowed for settling.

This method, therefore, is useable, advantageously, only when the desideratum is starch of high purity, and it is unimportant that the quantity of starch in the gluten is increased.

By decreasing the rate of delivery of the mill starch to the table heads, without changing the table pitch from that of standard practice, less starch will tail off with the gluten because the streams of mill starch flowing over the tables will be shallower; but the tendency of the gluten to settle with the starch, as a result of the greater shrinkage in volume of the mill starch as it flows down the table than occurs with liquors of less density, will be enhanced, because with the shallower stream the gluten is more likely to be trapped by inequalities in the surface of the deposited starch as the tabling operation proceeds. This procedure, therefore, can be used advantageously only where it is not important to produce a starch of the highest purity, that is with a minimum protein content.

By combining the last two described procedures it has been found possible, contrary to the convictions of those skilled in the art, to table mill starch at high density without sacrificing either starch purity or increasing the starch content of gluten. In fact the new practice has resulted in reduced protein in starch and reduced starch in gluten. By decreasing the rate of delivery of the mill starch to the table heads, the flow of the magma over the tables is in shallower streams preventing the starch from tailing off with the gluten, despite the higher density of the magma. By increasing the pitch of the tables these shallower streams are made to move more rapidly, which prevents the gluten from being trapped by the tabled starch, the surface of which is never perfectly even but is likely to be more or less channelled by the flow thereover of the mill starch liquor.

Theoretically at least, the diminution in depth of the streams could be effected by using wider tables instead of by decreasing the rate of flow per minute per table. However, practical considerations have determined within approximate limits the width of starch tables, and consequently it is much more practical to decrease the rate of delivery to the table heads in proportion approximately to the increase of the density of the mill starch liquor treated.

It will be understood that the specific figures of gallons of mill starch supplied to the table heads per minute are based, for practical reasons on a table inclination of 10 inches. Theoretically there should be a different table pitch for each density; but this is hardly practical for actual factory conditions. Moreover, the length and width of the table are necessarily factors and change of table length or width will necessarily involve corresponding adjustment of the factors of gallonage to the table heads and pitch of the tables. The above directions will make it possible, however, for anyone skilled in the art to work out for tables of any suitable length and width, the proper rate of flow and the proper pitch for any given density of mill starch substantially above the range of 5°–7° Baumé used in former practice, and, consequently, to adapt the present invention to varying conditions. The exact figures will depend also upon whether the ultimate desideratum is the reduction to a minimum of gluten in the starch or the reduction to a minimum of starch in the gluten. By referring to the density of the mill starch as being substantially in excess of 7° Baumé, the customary maximum in former practice, I intend densities of the order of say 11° to 15° Baumé and at least appreciably greater than 8° Baumé.

It is the intention to claim here all modifications within the scope of the appended claims.

I claim:

1. In the manufacture of starch from corn: the improvement which consists in tabling the mill starch at a density between 8° Baumé and 15° Baumé, delivering the same to the table heads at a rate (in the case of tables 110 feet long, 2 feet wide having a pitch not substantially less than 5 inches) varying from substantially 2.5 gallons per minute per table for an 8° Baumé density to 1.2 gallons per minute for a 15° Baumé density.

2. In the manufacture of starch from corn: the improvement which consists in tabling the mill starch at a density between 8° Baumé and 15° Baumé, delivering the same to the table heads at a rate (in the case of tables 110 feet long, 2 feet wide) varying from substantially 2.5 gallons per minute per table for an 8° Baumé density to 1.2 gallons per minute for a 15° Baumé density; with the tables pitched at an inclination of 5 inches, from end to end, for a density of 8° Baumé varied to 12 inches for a density of 15° Baumé.

3. In the manufacture of starch from corn: the improvement which consists in tabling the mill starch at a density of substantially 13° Baumé, delivering the mill starch to the table heads (in the case of tables 110 feet long and 2 feet wide) at a rate of approximately 1.8 gallons per minute per table, with the tables having a pitch of approximately 10 inches from end to end.

4. In the manufacture of starch from corn: the improvement which consists in tabling the mill starch at a density between 8° Baumé and 15° Baumé, delivering the mill starch to the table heads (in the case of tables 110 feet long and 2 feet wide) at a rate not substantially in excess of 2½ gallons per minute per table, and varying the pitch of the tables within the range of 5 to 12 inches, to counteract the tendency of the gluten to deposit with the starch.

5. In the manufacture of starch from corn: the improvement which consists in tabling the mill starch at a density substantially above 7° Baumé and decreasing the rate at which the mill starch is delivered to the tables and increasing the pitch of the tables, from the rate and pitch, respectively, used in tabling 7° Baumé mill starch, in proportion, substantially, to the increase in density of the mill starch over 7° Baumé.

6. In the manufacture of starch from corn: the improvement which consists in tabling mill starch at a density between 8° Baumé and 15° Baumé, and delivering the starch to the table heads in a volume per unit of time approximately proportioned inversely, to the density of the mill starch, with the tables pitched to an extent approximately in proportion, directly, to the mill starch density.

7. In the manufacture of starch from corn the improvement which consists in tabling mill starch at a density substantially above 7° Baumé, and delivering the starch to the table heads in a volume per unit of time approximately proportioned inversely to the density of the mill starch, with the tables pitched to an extent approximately in proportion, directly, to the mill starch density.

FREDERICK L. JEFFERIES.